June 7, 1960 L. P. CROSMAN 2,939,758

MAGNETIC DATA RECORDING APPARATUS

Filed Nov. 20, 1953

*INVENTOR.*
LORING P. CROSMAN

United States Patent Office 2,939,758
Patented June 7, 1960

2,939,758

MAGNETIC DATA RECORDING APPARATUS

Loring P. Crosman, Wilton, Conn., assignor to Sperry Rand Corporation, a corporation of Delaware Filed Nov. 20, 1953, Ser. No. 393,328

4 Claims. (Cl. 346—74)

The present invention relates to magnetic data recording apparatus and more particularly to keyboard actuated apparatus for recording magnetic patterns representative of information on a magnetizable recording medium such as magnetic tape.

Prior devices for recording data magnetically have employed multi-channel, electro-magnetic recording heads and relatively complex circuitry for selectively energizing the electro-magnets associated with the various channels. These prior devices have been intended to receive data at high speed from punched card or punched tape readers or from the internal storage of electronic computers and record the data at the same high speed on magnetic tapes or the like. The electrical and electronic complexity of these electro-magnetic recording devices has been justified by the high recording speeds afforded and by the ability of the electro-magnetic head both to read and to record. It is not unusual, for example, for such apparatus to read or record 3000 or more alphabetic or numeric characters per second.

When, as is frequently the case, it is necessary to transcribe data to magnetic tape from some other form which is not automatically sensible, it has been common practice to first manually transcribe the data to punched cards or punched tape and then automatically translate from the punched medium to magnetic tape. This rather indirect procedure has resulted from the lack of any suitable inexpensive device for transcribing directly to magnetic tape by means of a manually operated keyboard. This lack has been recognized as a handicap by many computer establishments for a number of years and is known to be a major obstacle to the application of electronic data processing equipment to business problems.

A suitable magnetic transcribing device for such applications should produce a printed record of the data on regular paper as well as the magnetic record on magnetic tape and, in addition, the device should be simple, inexpensive and operable by regularly trained office personnel. Provision should be made for correcting errors quickly and simply. The device need not be capable of high recording speeds; 10 characters per second (fast typing speed) will suffice.

Accordingly it is an object of this invention to provide novel, simple, and inexpensive key-actuated apparatus for recording data directly to a magnetizable recording medium.

Another object of the invention is to provide novel magnetic recording apparatus employing permanent magnets rather than electro-magnets for impressing magnetic patterns representative of data on a magnetizable recording medium.

A further object of the invention is to provide novel magnetic recording apparatus which comprises, in part, a standard typewriter and may be produced by relatively simple modifications thereof.

Other objects and features of the invention will be stated in or apparent from the following description and accompanying drawings.

Figures 1, 2, 3, 4:
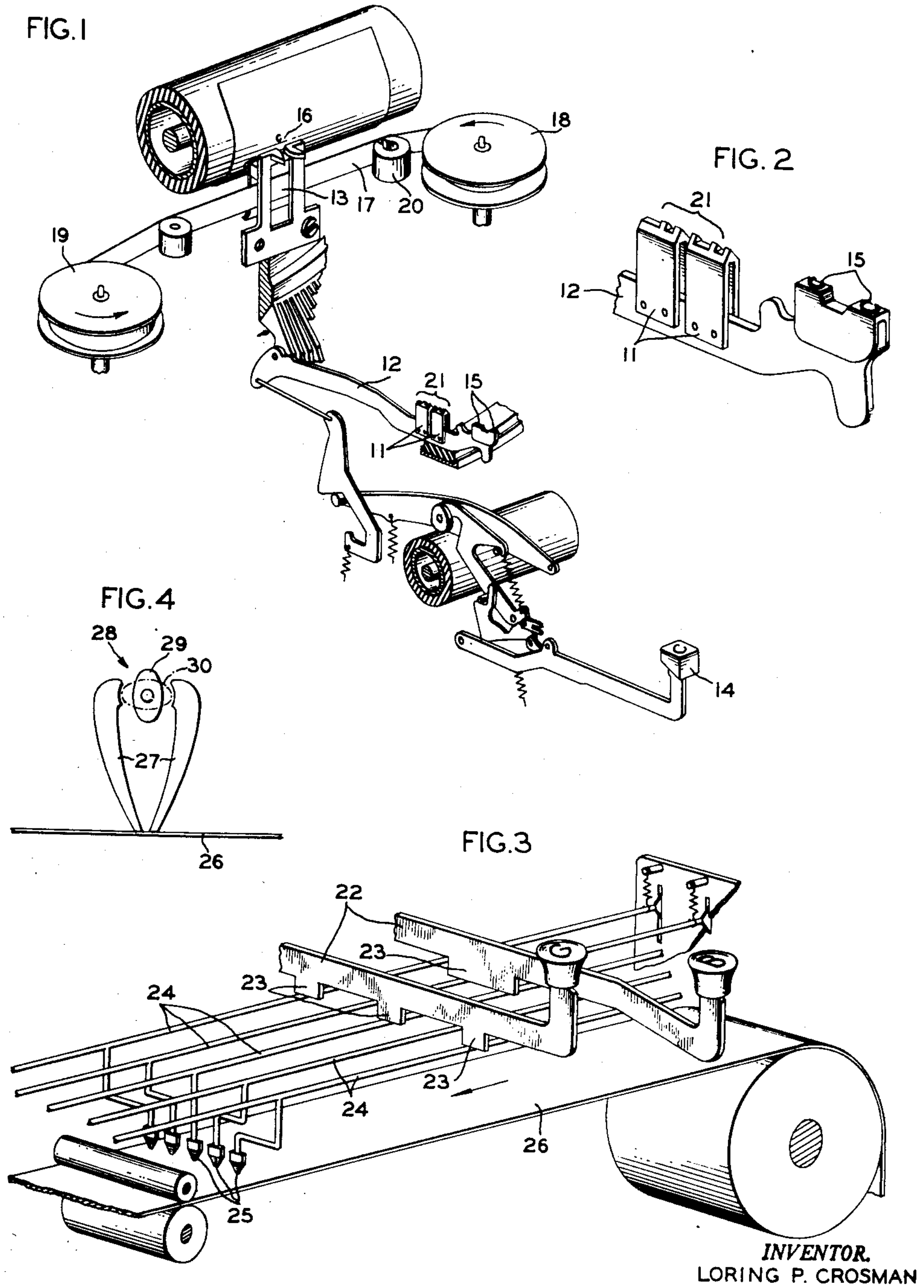
Fig. 1 shows a basic embodiment of the invention wherein assemblages of small permanent recording magnets are mounted on the type bars of a standard typewriter.
Fig. 2 shows an enlarged view of a typical type bar and the permanent magnets mounted thereon.
Fig. 3 shows an alternative embodiment of the invention in which a key controlled permutation system is used to selectively control the actuation of permanent magnets.
Fig. 4 shows an enlarged view of one of the permanent magnets and associated core structure of an embodiment wherein the recording magnets selectively energize stationary core structures.

According to the present invention magnetic "spots" representative of the data to be recorded are recorded on a magnetic tape by means of small permanent magnets rather than by electro-magnets as in prior art devices. The primary advantage of the present invention is its extreme simplicity and its adaptability to standard keyboard actuated devices, such as typewriters. Each of the various embodiments of the invention described in the following is based upon the use of a standard typewriter for printing and for selective keyboard control of the permanent recording magnets. It will be apparent, however, that other standard key actuated devices such as, for example, key punches or bookkeeping machines may be used instead of a typewriter. Also, while magnetic tape is described as the recording medium in each embodiment, it will be apparent that other magnetizable recording mediums such as magnetic sheets or cards may be employed.

Referring now to Fig. 1, a basic embodiment of the invention comprises a standard typewriter, assemblages of small permanent magnets 11 affixed to the type bars 12 of the typewriter, and record handling means for transporting a magnetic tape or other magnetizable recording medium past a recording station 13. The magnet assemblage 11 affixed to each type bar 12 is arranged to produce a unique magnetic flux pattern representative of the character associated with the type bar. When a key 14 is depressed, the type bar 12 carries the type 15 to the printing station 16 in the usual manner and also carries the associated magnet assemblage 11 to the recording station 13. The magnetic flux pattern of the magnet assemblage 11 is impressed upon the magnetizable recording medium, which may be a magnetic tape 17, at the recording station 13, at substantially the same time as the printed character is impressed upon the paper. When the key 14 is released, the type bar 12 carrying type 15 and magnet assemblage 11 is returned to its normal position. The magnetic pattern representative of the character printed is retained on the magnetizable recording medium due to the retentive properties of the medium and may be sensed or reproduced in various ways well known in the magnetic recording art.

The record handling means for transporting the magnetic recording medium is adapted to advance the medium past the recording station 13 after each key depression in a manner similar to the advancement of the carriage past the printing station 16. For transporting a magnetic tape 16, for example, means similar to a typewriter ribbon drive may be employed. The tape is fed from a feed reel 18 past the recording station 13 to a take-up reel 19 in the same manner as the typewriter ribbon. The feed and take-up reels 18 and 19 may be driven by the ribbon feed mechanism or a similar conventional mechanism.

A permanent erasing magnet 20 may be mounted between the feed reel and the recording station 13 for the purpose of magnetizing the entire tape to saturation in a polarity opposite to that impressed upon the tape by the magnet assemblages 11. This is not essential but will insure that any previously recorded data are erased and will afford a greater magnetic difference between areas of the tape influenced by recording magnets and other areas, thus permitting larger signals when the recorded tape is played back.

After each character is recorded on the magnetic recording medium, the medium must be advanced a sufficient distance that the recording of the next character will not significantly modify the previously recorded pattern. The requisite displacement will depend upon the size and configuration of the individual recording magnets 21 shown in Fig. 2. The magnets may be wedge shaped with the faces of the wedge oppositely poled so as to present a concentrated magnetic field extending effectively only a short distance along the direction the recording medium is advanced. The edge of the wedge shaped magnet should be slightly rounded to prevent impact damage to the recording medium.

The magnetic field of each of the recording magnets should extend a sufficient distance transverse to the direction the medium is advanced so that play back from the associated channel will not be significantly affected by slight transverse misalignment of the medium with a reading head. Sufficient space should be provided between the individual magnets of an assemblage to prevent the effective field of a magnet associated with one recording channel from effectively magnetizing portions of the medium lying in adjacent channels.

To correct an erroneously recorded character, the recording medium must be backspaced and the erroneous pattern must be replaced with the correct one. Backspacing of the recording medium may be readily accomplished if the record advancing means is arranged to move the recording medium synchronously with the typewriter carriage at all times except during carriage return. Backspacing of the carriage by depression of the backspace key will then backspace the magnetic recording medium to re-align the previously recorded character with the recording station. Merely depressing the correct key after backspacing will not suffice in the embodiment thus far described since the erroneous pattern previously recorded must first be obliterated and the recording medium at that point returned to its "erased" or normal state of magnetization. For this purpose, an otherwise unused type bar may be provided with a magnet extending across all recording channels and having a polarity the same as the erasing magnet 20. This type bar should have no type since it is not used for recording but rather for erasing. Further, it may be arranged so as not to cause carriage or recording medium advance. Correction procedure would then involve backspacing, striking the erase key and then striking the correct key.

The erase key may be eliminated and errors corrected simply by backspacing and striking over if each recording magnet assemblage 11 is provided with a magnet in each channel position. In this case, some of the magnets in an assemblage would have one polarity and the others would have opposite polarity. Each channel position would thus be positively recorded and no preliminary erasing would be necessary before striking over.

The embodiments thus far described have employed separate magnet assemblages affixed to the various typebars of the typewriter. The number of magnets may be reduced to one for each recording channel if a suitable permutation system is provided for selectively actuating the magnets. Such an embodiment is shown in Fig. 3. Each key lever 22 is provided with permutation extensions 23 adapted to cooperate with permutation bars 24 movably mounted below and transversely to the key levers 22. Each permutation bar 24 is operatively connected with a recording magnet 25 so that depression of the permutation bar by the permutation extension on selected key levers will move the recording magnet into operative relationship with a magnetic tape 26 or other magnetizable recording medium.

The recording magnets may be arranged to move into contact with the recording medium when actuated, as shown in Fig. 3, or may be arranged to move into operative relationship with a fixed core structure when actuated, as shown in Fig. 4. The core structure 27 may be in constant contact with the recording medium, and the magnet 28 associated with each core may be arranged to magnetize the core when actuated. To this end, the core structure and magnet should be arranged so that a large air gap exists between them when the magnet is in its normal position 29, and very little air gap will exist when the magnet is actuated to its recording position 30. In an embodiment of this type, the core structure 27 should be made of a material exhibiting high permeability but low retentivity.

While I have described what I consider to be a highly desirable embodiment of my invention, it is obvious that many changes in form could be made without departing from the spirit of my invention, and I therefore, do not limit myself to the exact form herein shown and described, nor to anything less than the whole of my invention as hereinbefore set forth, and as hereinafter claimed.

What is claimed is:

1. In a machine of the class described, the combination with a plurality of type bars, and a keyboard means operable for selectively actuating said type bars to print a selected character on a recording medium; of permanently magnetized means operated by each of said type bars, said magnetized means operating through a substantially wedge-shaped recording tip portion with the opposed tip faces oppositely poled when operated providing a flux pattern in a code configuration corresponding to the character printed by the associated type bar, and a separate magnetizabde recording medium supported in operative recording relation to said magnetized means for receiving the coded flux pattern when the selected type bar is actuated.

2. In a machine of the class described, the combination with a plurality of type bars, and a keyboard means operable for selectively actuating said type bars to print a selected character on a recording medium; of permanently magnetized means operated by each said type bars, said means operating through a substantially wedge-shaped recording tip portion with the opposed tip faces oppositely poled when operated providing a flux pattern in a code configuration corresponding to the character printed by the associated type bar, a separate and magnetizable recording medium for receiving the coded flux pattern of said magnetized means when the associated type bar is actuated, and means for transporting said magnetizable recording medium in successive steps into recording relation to said permanently magnetized means.

3. In a machine of the class described, the combination with a plurality of type bars, and a keyboard operable to selectively actuate said type bars to print a selected character; of permanently magnetized means operated by each of said type bars, said magnetized means comprising permanent magnets and when operated providing a flux pattern in a code configuration corresponding to the character printed by the associated type bar, each of said magnets being formed to provide a substantially wedge shaped recording tip, the opposed faces of each said tip being oppositely poled, and a magnetizable recording medium supported in operative recording relation to said magnetizing means for receiving the coded flux pattern when a selected type bar is actuated.

4. In a machine of the class described, the combination with a plurality of type bars, and a keyboard operable for selectively actuating said type bars to print a selected character; of magnetizing means comprising permanent magnets mounted on each of said type bars, said magnets being arranged in assemblages shaped to provide a plurality of concentrated magnetic fields disposed in coplanar relation to each other and constituting a flux pattern in a code configuration corresponding to the character printed by the associated type bar, each magnet of an assemblage being shaped to provide a substantially wedge shaped recording tip, the opposed faces of each said tip being oppositely poled, and a magnetizable recording medium supported in operative recording relation to said magnetizing means for receiving the coded flux pattern when the associated type bar is actuated.

References Cited in the file of this patent

UNITED STATES PATENTS

| | | |
|---|---|---|
| 2,067,183 | Green | Jan. 12, 1937 |
| 2,359,617 | Bryce | Oct. 3, 1944 |
| 2,511,121 | Murphy | June 13, 1950 |
| 2,560,474 | Potts | July 10, 1951 |
| 2,561,476 | Lang | July 24, 1951 |
| 2,672,395 | Lewis | Mar. 16, 1954 |
| 2,751,433 | Linger | June 19, 1956 |
| 2,784,392 | Chaimowicz | Mar. 5, 1957 |
| 2,791,310 | Jones | May 7, 1957 |
| 2,856,256 | Carman et al. | Oct. 14, 1958 |